(12) United States Patent
Marechal

(10) Patent No.: US 8,814,126 B2
(45) Date of Patent: Aug. 26, 2014

(54) ATTACHMENT SYSTEM FOR AN AIRCRAFT SEAT

(75) Inventor: Xavier Marechal, Paris (FR)

(73) Assignee: ATTAX, Carrieres sur Seine (FR)

( * ) Notice: Subject to any disclaimer, the term of this patent is extended or adjusted under 35 U.S.C. 154(b) by 379 days.

(21) Appl. No.: 12/844,470

(22) Filed: Jul. 27, 2010

(65) Prior Publication Data

US 2011/0073742 A1 Mar. 31, 2011

(30) Foreign Application Priority Data

Jul. 28, 2009 (FR) ...................................... 09 55266

(51) Int. Cl.
*A47B 97/00* (2006.01)
*A47C 1/00* (2006.01)
*B64D 11/06* (2006.01)

(52) U.S. Cl.
CPC .... *B64D 11/0696* (2013.01); *B64D 2011/0644* (2013.01)
USPC .................. 248/503.1; 297/344.1; 244/122 R

(58) Field of Classification Search
USPC ............. 248/503.1, 500, 501, 503, 429, 423, 248/424; 74/512, 500.5, 501.5 R, 501.6; 297/344.11, 344.1; 244/118.5, 118.6, 244/122 R; 410/80, 104, 105; 296/65.03
See application file for complete search history.

(56) References Cited

U.S. PATENT DOCUMENTS

| | | | |
|---|---|---|---|
| 3,381,927 A * | 5/1968 | Stamates ....................... | 248/429 |
| 4,376,522 A | 3/1983 | Banks | |
| 4,881,774 A * | 11/1989 | Bradley et al. ................ | 297/341 |
| 4,936,160 A * | 6/1990 | Barnard et al. ............... | 74/501.6 |
| 4,936,527 A * | 6/1990 | Gorges ......................... | 244/118.6 |
| 5,183,313 A * | 2/1993 | Cunningham .............. | 297/344.1 |
| 5,315,893 A * | 5/1994 | Behrens et al. ................. | 74/512 |
| 5,372,398 A * | 12/1994 | Aneiros et al. ............. | 296/65.03 |
| 5,511,763 A * | 4/1996 | Green ....................... | 251/129.02 |
| 5,634,686 A * | 6/1997 | Okazaki ........................ | 297/336 |
| 5,730,412 A * | 3/1998 | Shrock .......................... | 248/429 |
| 5,775,763 A * | 7/1998 | Glinter et al. .............. | 296/65.03 |
| 6,056,346 A * | 5/2000 | Smuk .......................... | 296/65.03 |
| 6,145,913 A * | 11/2000 | Odagaki .................... | 296/65.11 |

(Continued)

FOREIGN PATENT DOCUMENTS

| | | |
|---|---|---|
| DE | 299 02 465 | 7/1999 |
| FR | 2 926 062 | 7/2009 |

OTHER PUBLICATIONS

International Search Report dated Apr. 22, 2009, based on French International Application No. FR 0955266 filed Jul. 28, 2009.

*Primary Examiner* — Joshua J Michener
*Assistant Examiner* — Chiedu Chibogu
(74) *Attorney, Agent, or Firm* — Young & Thompson

(57) ABSTRACT

A system for attaching an aircraft seat to an aircraft. The system includes a pair of attachment devices. Each device includes a base connected to the seat, attachment means for attaching the seat to the rest of the aircraft, the attachment means being movable between a retracted position for fitting or dismantling the seat and an active position for blocking the seat. The attachment devices also include an operating lever to move the attachment means, the operating lever being articulated with the base and movable between a retracted position for fitting or dismantling the seat and an active position for blocking the lever in the active position. The attachment devices further include locking means for locking the lever in the active position, the locking means being disengageable by a rotary actuator.

4 Claims, 3 Drawing Sheets

(56) References Cited

U.S. PATENT DOCUMENTS

| | | | |
|---|---|---|---|
| 6,155,626 A * | 12/2000 | Chabanne et al. | 296/65.03 |
| 6,161,890 A * | 12/2000 | Pesta et al. | 296/65.01 |
| 6,164,153 A * | 12/2000 | Scura | 74/502.4 |
| 6,257,541 B1 * | 7/2001 | Timon et al. | 248/429 |
| 6,286,886 B1 * | 9/2001 | Odagaki | 296/65.11 |
| 6,299,120 B1 * | 10/2001 | Girardi et al. | 248/429 |
| 6,299,230 B1 * | 10/2001 | Oettl | 296/65.03 |
| 6,357,814 B1 * | 3/2002 | Boisset et al. | 296/65.03 |
| 6,443,414 B1 * | 9/2002 | Horsfield et al. | 248/429 |
| 6,488,249 B1 * | 12/2002 | Girardi et al. | 248/429 |
| 6,648,394 B2 * | 11/2003 | Lejeune et al. | 296/65.13 |
| 6,857,702 B2 * | 2/2005 | Becker et al. | 297/341 |
| RE38,845 E * | 10/2005 | Odagaki | 296/65.11 |
| 7,021,596 B2 * | 4/2006 | Lory | 248/429 |
| 7,971,843 B2 * | 7/2011 | Becker et al. | 248/424 |
| 2001/0019220 A1 * | 9/2001 | Timon | 297/344.11 |
| 2002/0043605 A1 * | 4/2002 | Hibino et al. | 248/429 |
| 2002/0043848 A1 * | 4/2002 | Kamida | 297/344.1 |
| 2003/0047977 A1 * | 3/2003 | Lejeune et al. | 297/344.1 |
| 2004/0124683 A1 * | 7/2004 | Matsumoto et al. | 297/344.1 |
| 2009/0021064 A1 * | 1/2009 | Shao | 297/344.1 |
| 2010/0320812 A1 * | 12/2010 | Linkner et al. | 297/183.6 |

\* cited by examiner

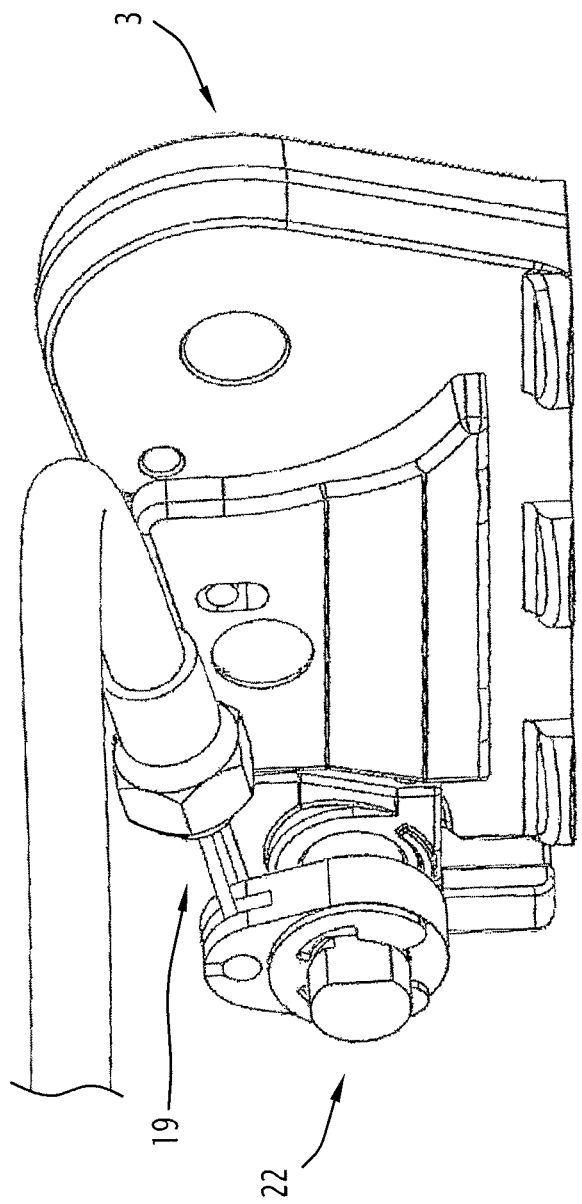

ATTACHMENT SYSTEM FOR AN AIRCRAFT SEAT

This is an application claiming priority to and benefit of French Patent Application Number 09 55266 filed Jul. 28, 2009 in France, the subject matter of which application is incorporated by reference herein.

BACKGROUND SUMMARY

The present disclosure relates to a system for attaching an aircraft seat to the rest of the aircraft.

Attachment systems for this type of application are already known in the prior art, in which systems seat attachment devices, of which there are, for example, two or four, enable the seat to be fixed to the rest of the aircraft.

Each attachment device generally comprises a base which is connected to the rest of the seat and is associated with means for attaching the seat to the rest of the aircraft. The means are movable between a retracted fitting/dismantling position and an active position for blocking of the seat, by way of an operating lever.

The operating lever is itself articulated at one end with the base and is accordingly movable between a retracted position for fitting/dismantling of the seat and an active position for blocking the lever in the active position, by way of means for locking it in position.

It is also known that such locking means are disengageable in order to allow the lever, and therefore the seat, to be released, and can, for example, be movable towards their disengaged position by a rotary actuator.

It is found, however, that this structure has a number of disadvantages because the fitting/dismantling operator has to act upon the various attachment devices one after the other in order to lock the seat or, on the contrary, dismantle it. That action is tedious and takes a long time.

The present disclosure relates to a system for attaching an aircraft seat to an aircraft that addresses the above-noted disadvantages.

Thus, the present disclosure relates to a system for attaching an aircraft seat to the rest of the aircraft. The system comprises devices for attaching the seat, each of which device is provided with a base which is connected to the rest of the seat and is associated with means for attaching the seat to the rest of the aircraft. The attachment means are movable between a retracted fitting/dismantling position and an active position for a blocking of the seat. That is done by way of an operating lever. The operating lever is articulated with the base and is movable between a retracted position for fitting/dismantling of the seat and an active position for blocking the lever in the active position. That is done by way of means for locking the lever in the active blocking position. The locking means can be disengaged by a rotary actuator. The attachment devices are associated in pairs, and the levers and associated rotary actuators thereof are connected to common control means. The common control means includes a pedal for moving the levers toward their active blocking position. The pedal is fixed to one of the levers and is connected to the other lever by articulated rigid connecting rod means. A disengagement member is connected to the rotary actuators of the attachment devices by a pull bar and cable means.

Embodiments according to the present disclosure may comprise: the connecting rod means including two rigid connecting rods which are articulated with one another by one of their ends and the other ends of which are associated with the corresponding levers of the attachment devices; one of the ends of the pull bar is connected to the disengagement member and the other to ends of two operating cables, the other ends of which cables are connected to the rotary actuators of the attachment devices; and the cables may be located in sleeves.

Other aspects of the present disclosure will become apparent from the following descriptions when considered in conjunction with the accompanying drawings.

BRIEF DESCRIPTION OF THE DRAWINGS

FIG. 3 shows an attachment device forming part of a system, according to the present disclosure.

DETAILED DESCRIPTION

Figure 1:
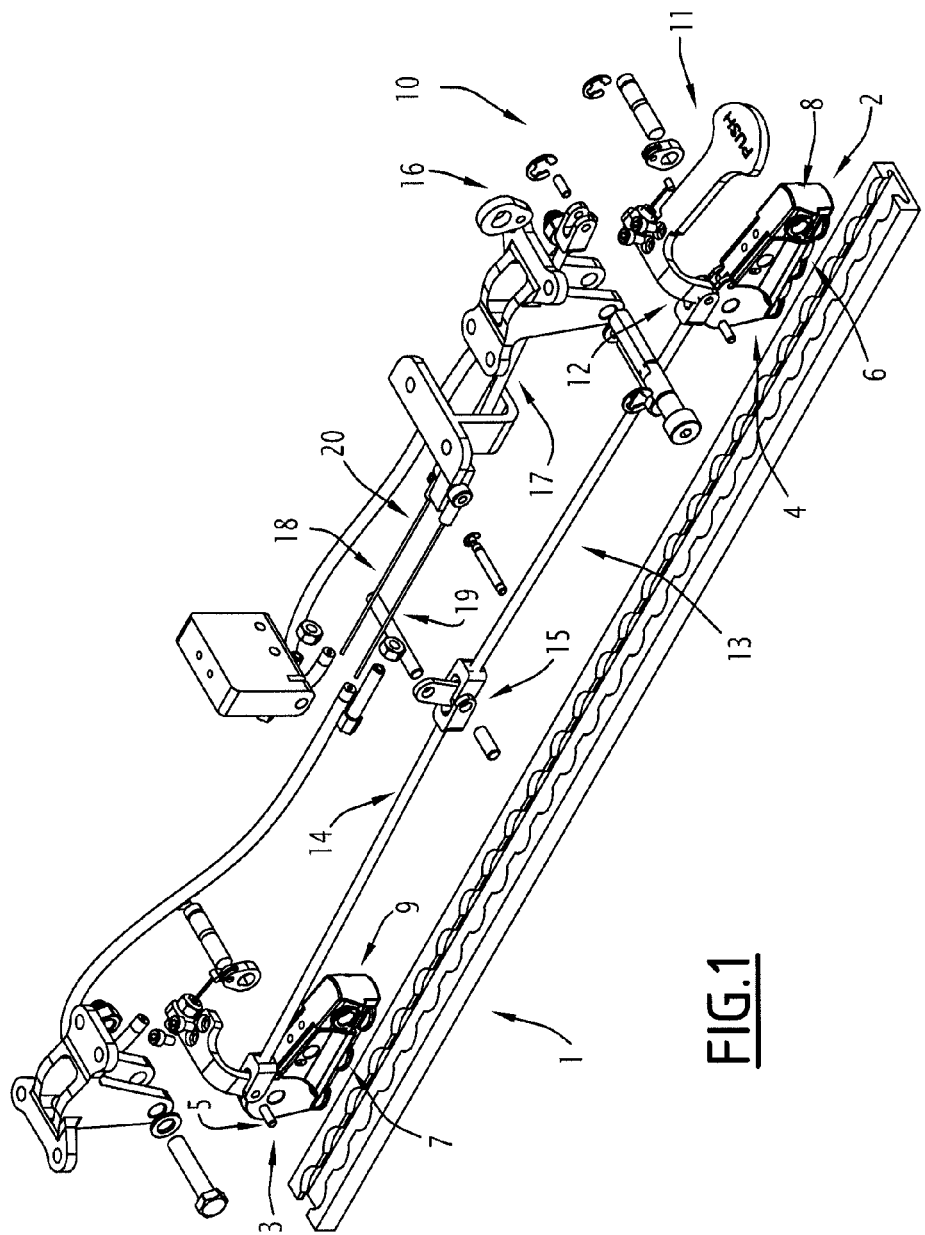
FIG. 1 shows an exploded perspective view of part of an attachment system for an aircraft seat, according to the present disclosure.

FIG. 1 shows a system for attaching an aircraft seat to the rest of the aircraft, according to the present disclosure.

The seat is fixed to the aircraft by way of, for example, rail means, designated by reference numeral 1, which engage means for attaching seat attachment devices.

In an embodiment shown in the Figures, two seat attachment devices are shown and are designated by reference numerals 2 and 3.

Accordingly, for example, the two attachment devices 2, 3 can be, in accordance with the present disclosure, provided on one of the sides of the seat, at the back and at the front thereof, respectively.

Each attachment device 2, 3 comprises a base, designated, for example, by reference numerals 4 and 5, which is connected to the rest of the seat and is associated with means for attaching the seat to the rest of the aircraft, by way of the rail means 1.

The attachment means are designated by reference numerals 6 and 7 and are suitable for engaging in and cooperating with the rail means 1 in order to fix the seat to the aircraft.

The attachment means 6 and 7 are movable between a retracted position for fitting or dismantling of the seat and an active position for blocking the seat in position, by way of an operating lever.

The operating levers are designated by reference numerals 8 and 9 for attachment devices 2 and 3, respectively.

One of the ends of each lever 8, 9 is articulated with the respective base 4, 5 of the respective device 2, 3 so that the lever 8, 9 is movable between a retracted position for fitting or dismantling of the seat and an active position for blocking in the active position, by way of locking means.

Various embodiments of the locking means are within the scope of the present disclosure having, for example, either a catch or having other means.

The locking means are disengageable by an actuator, for example a rotary actuator, as described in greater detail herein below.

As is shown in FIG. 1, the attachment devices 2, 3 are associated in pairs, and the levers 8, 9 of the attachment devices 2, 3 of the pairs, as well as actuators for disengagement of the locking means, are connected to common control means.

The common control means are designated by reference numeral 10 in FIG. 1 and comprise, for example, a locking pedal for the levers 8 and 9, for moving them towards their active blocking position.

The pedal is designated by reference numeral 11 in FIG. 1 and is fixed, for example, to the lever 8 of the attachment device 2 located at the back of the seat. This is by way of a corresponding attachment foot designated by reference numeral 12.

In addition, the pedal 11 is connected to the lever 9 of the other attachment device 3 of the corresponding pair of devices 2, 3 by way of articulated rigid connecting rod means.

For example, in FIG. 1, two connecting rods 13 and 14 are shown. The ends of the connecting rods 13, 14 that face one another are articulated with one another, for example, at 15, while their opposite ends are articulated with the levers 8, 9 of the attachment devices 2, 3.

By simply operating the pedal 11, a fitting operator is able to move the levers 8 and 9 of the two attachment devices 2, 3 at the same time towards their active position.

The common control means 11 likewise comprise an unlocking actuator, designated by reference numeral 16 in FIG. 1, which includes, for example, a rotary actuator. See FIG. 2 and discussion below regarding rotary actuators.

The rotary actuator is described in greater detail herein below. It is noted that the rotary actuator is connected by means of a pull bar, designated by reference numeral 17, to cable means, designated by reference numeral 18, which are themselves connected to the actuators, for example rotary actuators, for disengaging the means for locking the levers 8, 9 in the active position.

One of the ends of the pull bar 17 is connected in an articulated manner to the disengagement or unlocking actuator 16, while its other end is connected to ends of two operating cables 19 and 20. One cable 19 is connected to the rotary actuator for disengaging the locking means of the attachment device 3, and the other cable 20 is connected to the rotary actuator for disengaging the locking means of the attachment device 2.

Figure 2:
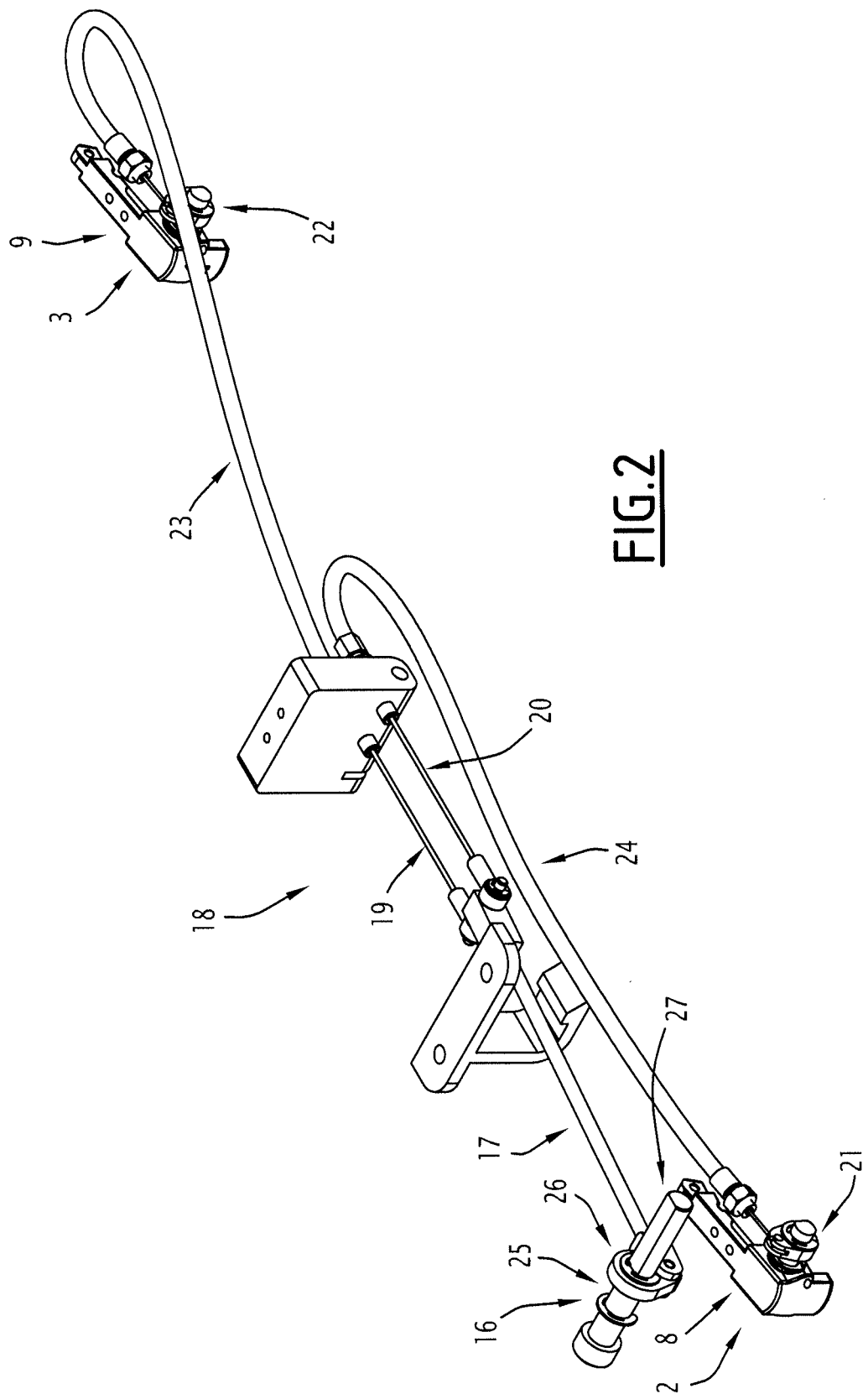
FIG. 2 shows cable means forming part of an attachment system, according to the present disclosure.

FIG. 2, and also in part, FIG. 3, show the attachment devices 2 and 3, the levers 8 and 9, the disengagement actuator 16, the pull bar 17, the cable means 18, comprising the cable 19 and the cable 20, and the rotary actuators for disengaging the corresponding locking means.

The lever 8 is, for example, associated with a rotary actuator 21, while the lever 9 is associated with a rotary actuator 22, each for disengaging the corresponding locking means.

Rotary actuator 22 is shown in greater detail in FIG. 3, which shows, for example, the attachment device 3 and its rotary actuator 22, the operation of which is controlled by the cable 19.

It is noted that the cables 19, 20 are, for example, movably mounted in sleeves 23 and 24 which extend in the direction of the attachment devices 2, 3.

As is shown in FIG. 2, the common disengagement actuator 16 can, for example, comprise an operating rod, designated by reference numeral 25, which is connected by a driving arm 26 to the pull bar 17 and which can be moved in rotation by way of an operating member 27. Operating member 27 can be actuated by the operator in order to exert a pull on the pull bar 17 and therefore, by way of the cables 19, 20, effect rotation of the rotary actuators 21, 22 for disengaging the locking means of the attachment devices 2, 3.

It is noted that, when an operator wishes to lock a seat in position, he merely has to push the common pedal 11 in order to move the levers 8, 9 of the two associated attachment devices 2, 3 of the pair towards their locking position at the same time.

When he wishes to disengage the locking means, he actuates the common disengagement actuator 16 in order to unlock the levers 8, 9 of the two attachment devices 2, 3 at the same time.

Other embodiments of this system for attaching an aircraft seat to an aircraft are within the scope of the present disclosure.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A seat attaching system for attaching an aircraft seat to an aircraft, the system comprising:
    a pair of attachment devices, each attachment device including
    a base for connection to a seat,
    attachment means coupled to each base for attaching to the rest of the aircraft, the attachment means being movable between a retracted position for fitting or dismantling a seat and an active position for blocking a seat in position,
    an operating lever coupled to each base to move the corresponding attachment means between a retracted position for fitting or dismantling a seat and an active position for blocking the operating lever in the active position, and
    locking means for locking each operating lever in the active position, the locking means being connected to and disengageable by a rotary actuator coupled to each attachment device; and
    a common control means connecting to the lever and the rotary actuator of each attachment device, the common control means including a pedal to move the levers toward their active position, the pedal being fixed to one of the levers and connected to the other lever by an articulated rigid connecting rod means, and a disengagement member connected to both rotary actuators by a pull bar and cable means.

2. The seat attaching system according to claim 1, wherein the connecting rod means comprise two rigid connecting rods which are articulated with one another at one of their respective ends and the other ends are connected with one of the levers of the attachment devices.

3. The seat attaching system according to claim 1, wherein one end of the pull bar is connected to the disengagement member and the other end is connected to ends of two operating cables of the cable means, and the other ends of the two operating cables are connected to the rotary actuators of the attachment devices.

4. The seat attaching system according to claim 3, wherein the operating cables are located in sleeves.

* * * * *